R. G. GOSE.
DRAFT EQUALIZER.
APPLICATION FILED APR. 29, 1911.
1,030,078.
Patented June 18, 1912.
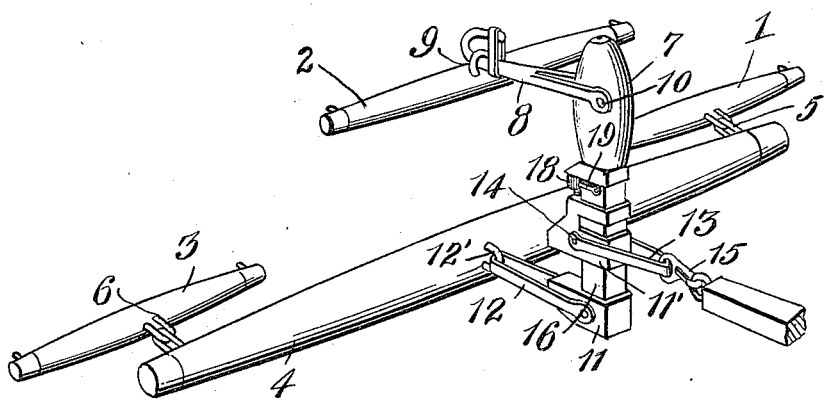
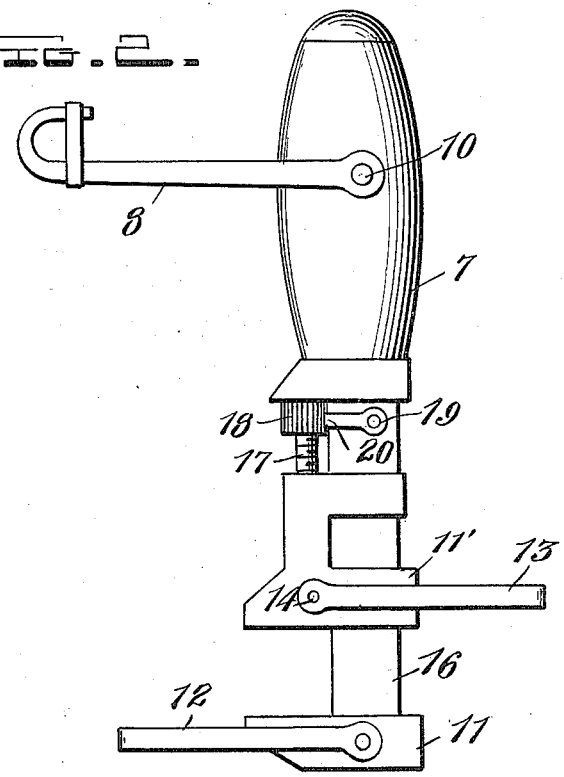
Witnesses
Chas. L. Griesbauer.
L. G. Ellis.
Inventor
R. G. Gose.
By Watson E. Coleman,
Attorney

UNITED STATES PATENT OFFICE.

ROBERT G. GOSE, OF UPTON, WYOMING.

DRAFT-EQUALIZER.

1,030,078. Specification of Letters Patent. Patented June 18, 1912.

Application filed April 29, 1911. Serial No. 624,139.

*To all whom it may concern:*

Be it known that I, ROBERT G. GOSE, a citizen of the United States, residing at Upton, in the county of Weston and State of Wyoming, have invented certain new and useful Improvements in Draft-Equalizers, of which the following is a specification, reference being had to the accompanying drawings.

My invention relates to a vertical draft equalizer and has for its objects to provide a device which can be used for equalizing the load on horses which are attached to a plow or the like.

Another object of my invention is to arrange such a device so that it can be suitably adjusted to the strength of the horse that is pulling on the central portion of the draft appliance.

A further object of my invention is to have such a device arranged so that it can be easily removed from the harness to which it is attached and used for other purposes such as those for which wrenches and the like are used.

This appliance is primarily attached to the central swingle tree of a draft attachment, which is used when three or more horses are used to pull on a plow or the like. Ordinarily such a device is permanently set, and is not capable of being adjusted to the strength of the central horse which is not in all cases equal to that of the horses on either side, and very often causes an unequal strain to be put on the horse and the result is that full power is not derived from them. When an adjusting means, such as I have used in my invention, is used, it is possible to very easily arrange the harness so that all the horses put an equal amount of pulling power on the plow or the like which is behind them.

In the accompanying drawings, which illustrate by way of example an embodiment of my invention, Figure 1 represents a plow draft equalizer embodying my invention applied to a draft appliance arranged for three horses; and Fig. 2 is a detail of the device embodying my invention.

In the accompanying drawings, 1, 2 and 3 represents swingle-trees for three horses which are secured to a main draft tree 4 through the links 5, 6 and the draft equalizer 7. 1 and 3 are for the outside horses and 2 is for the central horse.

In order to attach the middle swingle-tree to the draft equalizer 7 an arm 8 having a hook and catch on the end of it for insertion in a ring 9 of the swingle-tree 2 is provided, the arm 8 being held to the draft equalizer 7 by means of a suitable rivet 10 or the like. This draft equalizer is preferably shaped like an ordinary monkey wrench having on the lower jaw 11 a bifurcated arm 12 pivotally mounted thereon and having one end secured to a ring 12' of the main tree 4. In order to provide an attachment to which the plow or the like can be secured, a bifurcated arm 13 is pivotally attached to that portion that represents the second jaw 11' of the wrench by any suitable means 14, and to its outer end is attached a ring and catch 15 so that the plow or car can be secured thereto. The part 11' is suitably mounted and movable on a shank or bar 16 and has working in it a threaded piece 17 and knurled nut 18 which can be rotated to force the member 11' up and down in the ordinary wrench manner. In order to lock the nut 18 in any position a locking arm 19 is provided pivotally mounted on the part 16. This locking arm 19 is preferably arranged with a wedge shaped end 20 to fit into the nurls or slots of the nut 18.

In operation the bifurcated arm 12 with its ring 12' is attached to the main tree 4. The plow or other device is then secured to the ring and catch 15 of the bifurcated arm 13 which is secured to the movable jaw 11'. Then the upper arm 8 is secured to the middle or central tree to which the middle horse is attached. The horses are then started and should there be an unequal pull on the trees, as, for instance, the two outer horses pulling with more effect than the central horse, the knurled nut is turned so that the jaw 11' is adjusted to such a point that the pull on the plow will be evenly distributed to the three horses, and then the locking device 19 is pushed into position so that there will be no likelihood of there being an unequal strain caused by the jaws moving from the set position.

Should any occasion arise, as, for instance, when this draft appliance is not in use, it is but a matter of a few seconds to detach the hooks from the various trees and make use of the wrench.

The general arrangement of this device is such that it gives, besides its adjusting advantages, a certain amount of strength which is particularly desirable where there is a heavy pull to be provided for and, further, it can be used for many other purposes because of the extra arms and pieces attached to it, depending a great deal on the ingenuity of the one possessing it. The necessity of such an adjusting arrangement is well known to farmers as well as others that use three or more horses for pulling against loads as under the usual arrangement it often happens that the central horse particularly, is given an unequal amount of a load to pull which tends to strain and even ruin the horse. Should the central horse get tired and slack up he will, of course, put a greater load on the remaining horses so that no matter how the usual arrangement works, it is detrimental and inefficient. By the attachment just described even should the horses vary in strength, as they are progressing on their way, an adjustment can be readily made with hardly any trouble.

While I have shown my device with only three horses, I anticipate the use of such a device with more or less than this number, and I do not wish to limit myself in any way, otherwise than necessitated by the prior art, as many modifications of my invention can be made without departing from the principles thereof.

Having thus described my invention, I claim:—

1. In a draft equalizer, the combination of a bar having draft attaching means secured to its upper and lower portions, a movable element disposed on said bar, other draft connecting means connected thereto, said element being provided with a threaded hole therein, threaded means securely fastened to said bar and arranged to actuate within said threaded hole for adjusting the relative position of said element with respect to the first mentioned attaching means.

2. In a draft equalizer, the combination of a bar having a draft attaching means secured to its upper and lower portions, a movable element disposed on said bar, other draft connecting means connected thereto, said element being provided with a threaded hole therein, threaded means securely fastened to said bar and arranged to actuate within said threaded hole for adjusting the relative position of said element with respect to the first mentioned attaching means and means for locking said threaded member against rotation.

3. In a draft appliance, the combination of a bar having its upper portion enlarged and provided with a bolt therethrough and having its lower portion enlarged so that one portion of the same will extend outwardly relatively far on one side thereof, a bifurcated arm disposed on said bolt and having its outer end curved so as to engage with the central swingle-tree of the draft appliance, means for locking said swingle-tree to said curved portion, a member adjustable vertically on said bar and provided with a plurality of holes therein, one of said holes being threaded, a screw disposed in said threaded hole and provided with a knurled knot thereon, said screw being arranged to adjust said member, a bolt or the like disposed in another of said holes, a U-shaped member pivotally disposed on said bolt and holding said member thereby, said U-shaped member having means provided thereon to secure it to a plow or the like, another U-shaped member disposed on said lower portion of the bar and adapted to be secured to the main tree of the draft appliance and means for locking said knurled knot, so that said adjustable member will be held securely in position.

In testimony whereof I hereunto affix my signature in the presence of two witnesses.

ROBERT G. GOSE.

Witnesses:
F. L. YOUNG,
B. C. WARREN.